(12) United States Patent
Jayakumar et al.

(10) Patent No.: US 11,222,119 B2
(45) Date of Patent: Jan. 11, 2022

(54) TECHNOLOGIES FOR SECURE AND EFFICIENT NATIVE CODE INVOCATION FOR FIRMWARE SERVICES

(71) Applicant: Intel Corporation, Santa Clara, CA (US)

(72) Inventors: Sarathy Jayakumar, Portland, OR (US); Mohan J. Kumar, Aloha, OR (US); Ron Story, Santa Clara, CA (US); Mahesh Natu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/392,863

(22) Filed: Apr. 24, 2019

(65) Prior Publication Data
US 2019/0251264 A1 Aug. 15, 2019

Related U.S. Application Data

(60) Provisional application No. 62/739,391, filed on Oct. 1, 2018.

(51) Int. Cl.
*G06F 9/04* (2006.01)
*G06F 21/57* (2013.01)
(Continued)

(52) U.S. Cl.
CPC ............ *G06F 21/572* (2013.01); *G06F 9/449* (2018.02); *G06F 9/4411* (2013.01);
(Continued)

(58) Field of Classification Search
CPC ...... G06F 21/572; G06F 9/449; G06F 9/4411; G06F 9/45558; G06F 2009/45579; G06F 2009/45583
See application file for complete search history.

(56) References Cited

U.S. PATENT DOCUMENTS

| 2009/0063835 A1* | 3/2009 | Yao ..................... G06F 9/45558 713/2 |
| 2014/0281731 A1* | 9/2014 | Bogsanyi .................. G06F 9/00 714/38.1 |

(Continued)

FOREIGN PATENT DOCUMENTS

WO    2014018037    1/2014

OTHER PUBLICATIONS

Extended European search report for European patent application No. 19183080.1, dated Oct. 30, 2019 (11 pages).

(Continued)

*Primary Examiner* — Doon Y Chow
*Assistant Examiner* — Abdou K Seye
(74) *Attorney, Agent, or Firm* — Compass IP Law, PC (57) ABSTRACT

Technologies for secure native code invocation include a computing device having an operating system and a firmware environment. The operating system executes a firmware method in an operating system context using a virtual machine. In response to invoking the firmware method, the operating system invokes a callback to a bridge driver in the operating system context. In response to the callback, the bridge driver invokes a firmware runtime service in the operating system context. The firmware environment executes a native code handler in the operating system context in response to invoking the firmware runtime service. The native code handler may be executed in a de-privileged container. The firmware method may process results data stored in a firmware mailbox by the native code handler, which may include accessing a hardware resource using a firmware operation region.

25 Claims, 4 Drawing Sheets (51) Int. Cl.
　　　*G06F 9/455*　　　(2018.01)
　　　*G06F 9/448*　　　(2018.01)
　　　*G06F 9/4401*　　(2018.01)

(52) U.S. Cl.
　　　CPC .............. *G06F 9/45558* (2013.01); *G06F 2009/45579* (2013.01); *G06F 2009/45583* (2013.01)

(56) References Cited

U.S. PATENT DOCUMENTS

| 2019/0156015 A1* | 5/2019 | Brannock | ............... G06F 21/44 |
| 2019/0243630 A1* | 8/2019 | England | ................ G06F 21/554 |

OTHER PUBLICATIONS

ACPI Component Architecture Programmer Reference, http://developer.intel.com/technology/iapc/acpi/downloads/ACPICA-ProgRef.pdf, dated Apr. 18, 2003.

\* cited by examiner

TECHNOLOGIES FOR SECURE AND EFFICIENT NATIVE CODE INVOCATION FOR FIRMWARE SERVICES

CROSS-REFERENCE TO RELATED APPLICATION

The present application claims the benefit of U.S. Provisional Patent Application No. 62/739,391, filed Oct. 1, 2018.

BACKGROUND

Computing devices typically include firmware responsible for hardware initialization, low-level hardware management, and managing the boot process. The main platform firmware responsible for booting the computing device may be implemented according to the Unified Extensible Firmware Interface ("UEFI") specification, which has several versions published by the UEFI Forum. The UEFI specification specifies an interface between the firmware of the computing device and the operating system of the computing device. In addition to performing traditional boot and initialization tasks, such drivers and applications may perform other tasks, such as diagnostic, maintenance, or management tasks. Typical computing devices also support the Advanced Configuration and Power Interface (ACPI), which provides standardized, flexible mechanisms for device discovery, operating system configuration and power management (OSPM), thermal management, and other platform management tasks. Recent versions of the ACPI specification have also been published by the UEFI Forum.

Certain processors provide a special operating mode called system management mode ("SMM") for handling certain interrupts generated by hardware components of the computer platform, called system management interrupts ("SMIs"). Upon detecting an SMI, such a processor suspends execution by saving its current state and then entering SMM. Once in SMM, the processor executes SMI handler code. Such SMI handler code may perform tasks such as error handling, power management, device hot plug management, or other platform management tasks. Upon completion, the SMI handler code executes a resume instruction (e.g., "RSM"), causing the processor to reload its saved state and resume execution in the previous operating mode. Receiving the SMI, entering SMM, and the operation of the SMI handler are thus transparent to other code executing on the processor, including operating system code and/or platform firmware.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
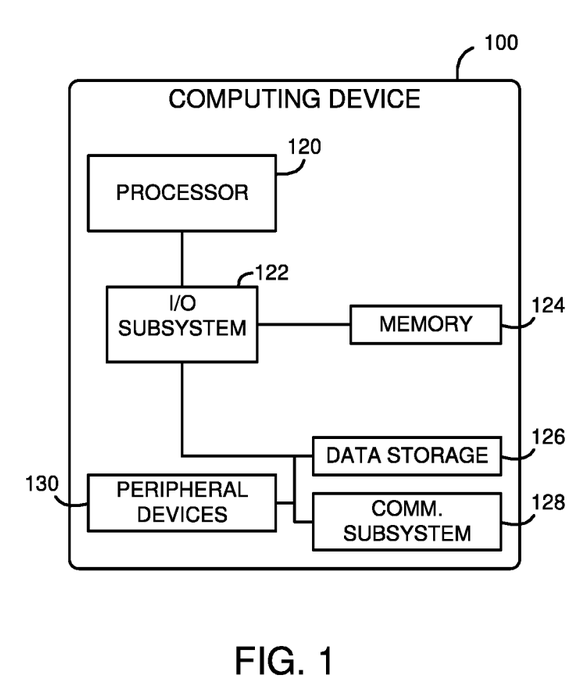
FIG. 1 is a simplified block diagram of at least one embodiment of a computing device for secure native code invocation.

Referring now to FIG. 1, a computing device 100 for secure native code invocation is shown. In use, as described further below, the computing device 100 installs a native code handler as a firmware runtime service and publishes an associated device object in a platform firmware table. For example, the native code handler may be installed as a UEFI runtime service, and the device object may be an ACPI device object included in the ACPI namespace. The computing device 100 binds an operating system bridge driver to the device object. At runtime, the computing device 100 invokes an ACPI source language (ASL) context, for example to handle a system control interrupt (SCI). The ASL code notifies the device object, which causes a callback to the bridge driver. The bridge driver invokes the firmware runtime service in a de-privileged container. Thus, the computing device 100 allows for native code to be invoked from an ASL context, which may avoid certain limitations imposed by the relatively restrictive ASL language and runtime environment. Additionally, allowing native code may improve firmware development by reducing complexity compared to the relatively complicated ASL language and runtime environment. Further, the firmware runtime service may be invoked in an operating system context or operating mode (e.g., protected mode, long mode, etc.), without requiring the processor to enter system management mode (SMM). By avoiding SMM, the computing device 100 may improve security and performance. In particular, native code execution may be managed by the operating system and/or platform firmware, whereas SMM code is transparent to the operating system and firmware and thus cannot be audited or attested. Additionally, entering SMM typically requires all processor cores on the system to halt execution and rendezvous, and thus may cause unpredictable performance jitter.

The computing device 100 may be embodied as any type of device capable of performing the functions described herein. For example, the computing device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative computing device 100 includes a processor 120, an I/O subsystem 122, a memory 124, and a data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers.

As shown, the processor 120 is communicatively coupled to the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. As shown, the memory 124 may be directly coupled to the processor 120, for example via an integrated memory controller hub. Additionally, in some embodiments, the I/O subsystem 122 may form a portion of a system-on-a-chip (SoC) and be incorporated, along with the processor 120, the memory 124, and/or other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 124.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 100 may further include one or more peripheral devices 130. The peripheral devices 130 may include any number of additional input/output devices, interface devices, hardware accelerators, and/or other peripheral devices. For example, in some embodiments, the peripheral devices 130 may include a touch screen, graphics circuitry, a graphical processing unit (GPU) and/or processor graphics, an audio device, a microphone, a camera, a keyboard, a mouse, a network interface, and/or other input/output devices, endpoints, interface devices, and/or peripheral devices.

Figure 2:
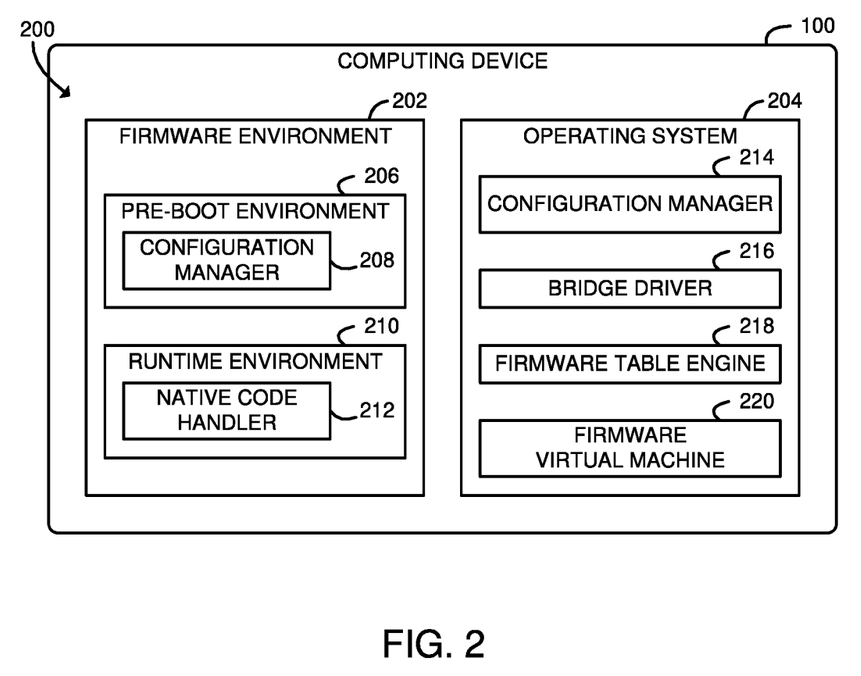
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a firmware environment 202 and an operating system 204. The firmware environment 202 includes a pre-boot environment 206, including a configuration manager 208, and a runtime environment 210, including a native code handler 212. The operating system 204 includes a configuration manager 214, a bridge driver 216, a firmware table engine 218, and a firmware virtual machine 220. The various components of the environment 200 may be embodied as hardware, firmware, software, or a combination thereof. As such, in some embodiments, one or more of the components of the environment 200 may be embodied as circuitry or collection of electrical devices (e.g., firmware environment circuitry 202 and/or operating system circuitry 204). It should be appreciated that, in such embodiments, one or more of the firmware environment circuitry 202 and/or the operating system circuitry 204 may form a portion of the processor 120, the I/O subsystem 122, the peripheral devices 130, and/or other components of the computing device 100. Additionally, in some embodiments, one or more of the illustrative components may form a portion of another component and/or one or more of the illustrative components may be independent of one another.

The firmware environment 202 may be embodied as platform firmware of the computing device 100, such as a Unified Extensible Firmware Interface (UEFI) environment, an Advanced Configuration and Power Interface (ACPI) environment, a Basic Input/Output System (BIOS) firmware environment, or other firmware of the computing device 100. Similarly, the operating system 204 may be embodied as any operating system, virtual machine monitor, hypervisor, or other runtime control structure of the computing device 100. The operating system 204 may be loaded by a boot loader or other component executed by the firmware environment 202. As shown, the firmware environment 202 includes the pre-boot environment 206 and the runtime environment 210. The pre-boot environment 206 may be embodied as a UEFI Driver Execution Environment (DXE) or other environment that supports executing boot services, drivers, or other native code firmware images before loading the operating system 204. The runtime environment 210 may be available after the pre-boot environment 206 has ended, for example by a call to EndBootServices( ) and may be available while the operating system 204 is active. The runtime environment 210 may support executing runtime services, drivers, or other native code firmware images.

The operating system 204 is configured to execute a firmware method with the virtual machine 220 in an operating system context. The operating system context may be a processor execution mode, such as protected mode, long mode, or other execution mode. The firmware virtual machine 220 may be embodied as an ACPI machine language (AML) virtual machine or other virtual machine that executes bytecode associated with one or more firmware control methods. In some embodiments, the firmware method may be executed in response to a system control interrupt being raised by the computing device. In some embodiments, the operating system 204 may be configured to invoke execution of the firmware method.

The operating system 204 is further configured to invoke a callback to the bridge driver 216 in the operating system context in response to executing the firmware method. Invoking the callback may include invoking a notify operator on a bridge driver device object of a firmware device hierarchy by the firmware method executed with the virtual machine 220. The operating system 204 may be further configured to bind the bridge driver 216 to the bridge driver device object. The operating system 204 may be further configured to store a parameter in a firmware mailbox by the firmware method executed by the virtual machine 220, and to invoke the callback after the parameter is stored. The operating system 204 may be further configured to process results data from the firmware mailbox by the firmware method executed by the virtual machine 220 in response executing the native code handler 212 as described further below. Processing the results data may include accessing a hardware resource using a firmware operation region. The operating system 204 may be configured to enforce a synchronization method (e.g., a lock) associated with the hardware resource. The bridge driver 216 is configured to invoke a firmware runtime service in the operating system context in response to invoking the callback. The bridge driver 216 may, for example, look up a global unique identifier (GUID) of the firmware runtime service. The bridge driver 216 may be further configured to configure a memory page table for a de-privileged container in response to the invoking the callback. In some embodiments, those functions of the operating system 204 may be performed by one or more sub-components, such as the configuration manager 214, the bridge driver 216, the firmware table engine 218, and/or the firmware virtual machine 220.

The firmware environment 202 is configured to execute the native code handler 212 in the operating system context in response to invocation of the firmware runtime service. The native code handler 212 may be embodied as a UEFI firmware runtime service, a function, a native code image, or other native code that may be executed by the processor 120 of the computing device 100. The native code handler 212 may be executed in a de-privileged container, for example in a virtual addressing mode with access restrictions imposed by one or more memory page tables configured as described above. The firmware environment 202 may be further configured to access, by the native code handler 212, the parameter stored by the firmware method in the firmware mailbox and to store, by the native code handler 212, results data in the firmware mailbox. The firmware environment 202 may be further configured to publish a firmware table, such as an ACPI table, that includes the bridge driver device object. The firmware environment may be further configured to install the native code handler 212 as the firmware runtime service, for example by associating a GUID with the firmware runtime service. In some embodiments, those functions of the firmware environment 202 may be performed by one or more sub-components, such as the pre-boot environment 206 (e.g., by the configuration manager 208) and/or the runtime environment 210 (e.g., by the native code handler 212).

Figure 3:
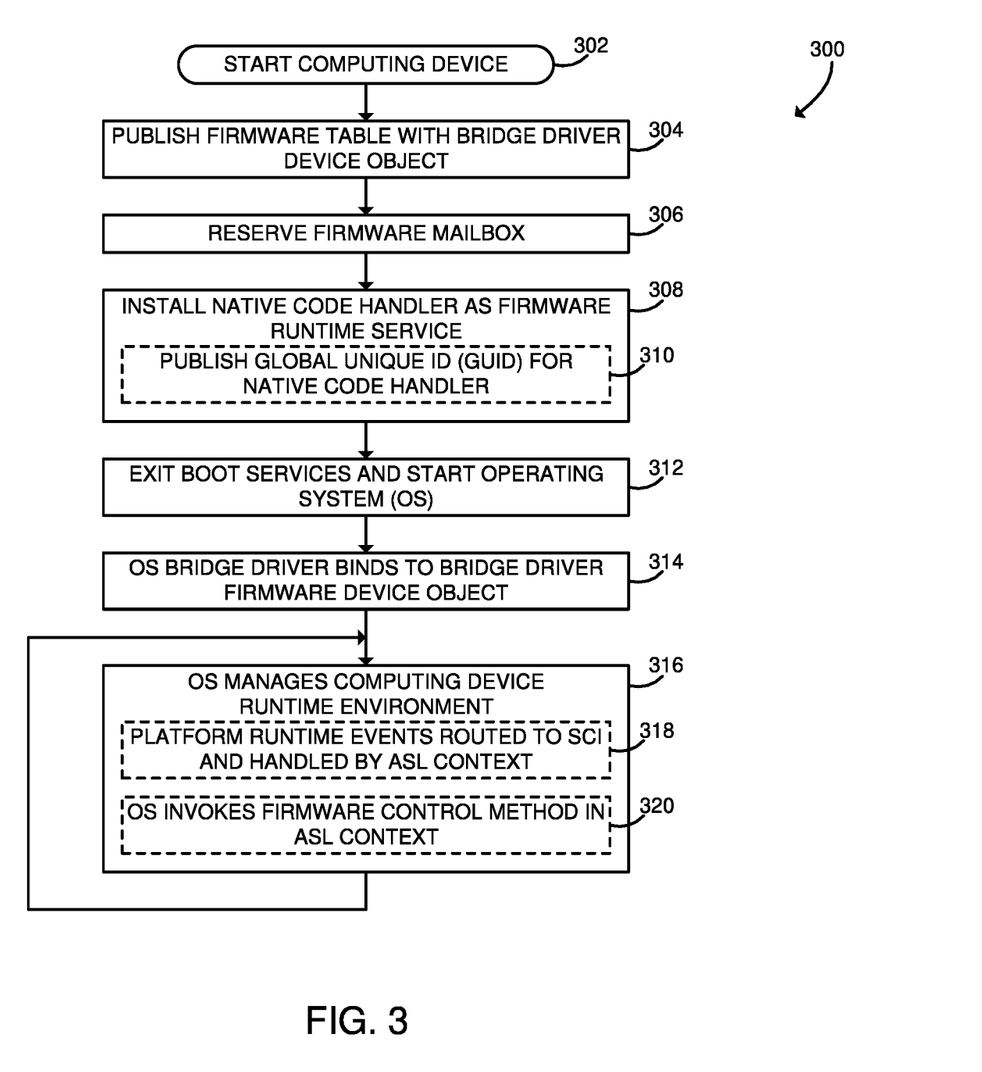
FIG. 3 is a simplified flow diagram of at least one embodiment of a method for booting and configuring a computing device for secure native code invocation that may be executed by an I/O device of the computing device of FIGS. 1-2.

Referring now to FIG. 3, in use, the computing device 100 may execute a method 300 for booting and configuring secure native code invocation. It should be appreciated that, in some embodiments, the operations of the method 300 may be performed by one or more components of the environment 200 of the computing device 100 as shown in FIG. 2. The method 300 begins with block 302, in which the computing device 100 starts the boot process. The computing device 100 may boot in response to being powered on, in response to a reset, or in response to another power cycle event. As part of the boot process, the computing device 100 loads and executes a pre-boot firmware environment, such as a UEFI pre-boot environment. For example, the computing device 100 may load the pre-boot environment 206 of the firmware environment 202.

In block 304, the computing device 100 publishes a firmware table with a bridge driver device object. For example, the computing device 100 may install an ACPI table (e.g., DSDT, SSDT, FACS, or other ACPI table) that includes the bridge driver device object. The bridge driver device object may be defined in ACPI source language (ASL) code or otherwise defined by the platform firmware. As described further below, the bridge driver device object may be used by ASL code to notify the operating system 204 of a request for native code execution.

In block 306, the computing device 100 reserves a firmware mailbox. The firmware mailbox may be embodied as a reserved range of the memory 124, the data storage 126, or other addressable location. The firmware mailbox may be accessed by firmware runtime services and by firmware executing in the ASL context. The firmware mailbox may be marked as reserved in a system memory map and thus may not be accessible to user code, operating system drivers, or other parts of the operating system 204.

In block 308, the computing device 100 installs the native code handler 212 as a firmware runtime service. The computing device 100 may use any technique that allows the native code handler 212 to be invoked after boot of the operating system 204. For example, the native code handler 212 may be installed as a UEFI runtime service 208 that is available after exiting the pre-boot environment 206. The native code handler 212 may be installed as a function in a firmware reserved memory region. The native code handler 212 may be invoked using a predetermined function calling convention (e.g., a C calling convention). In some embodiments, in block 310 the computing device 100 may publish a global unique identifier (GUID) for the native code handler 212. As described further below, the GUID may be used by the operating system 204 to look up and invoke the native code handler 212.

In block 312, the computing device 100 exits the pre-boot environment 206 and starts the operating system 204. For example, a bootloader or other component may invoke ExitBootServices( ) and pass control of the computing device 100 to the operating system 204. After exiting boot services, the runtime environment 210 of the firmware environment 202 remains available for execution.

In block 314, the bridge driver 216 binds to the bridge driver device object. The bridge driver 216 may use any technique to register or otherwise associate with the bridge driver device object. For example, the bridge driver 216 may locate the bridge driver device object in an ACPI namespace or ACPI table and register the bridge driver device object with the operating system 204 (e.g., with the firmware table engine 218). The bridge driver 216 may register a callback function or other entry point with the operating system 204. As described further below, after binding with the bridge driver device object, the bridge driver 216 may receive callbacks in response to notifications directed to the bridge driver device object from ASL code.

In block 316, the operating system 204 manages the runtime environment of the computing device 100. The operating system 204 may manage execution of applications, libraries, and other workloads of the computing device 100. During execution, hardware and/or software of the computing device 100 may request certain platform management services. The computing device 100 routes those requests for platform management services to an ASL context. For example, the computing device 100 may handle such requests using the firmware virtual machine 220. The virtual machine 220 executes ACPI machine language (AML) code, which may include one or more ACPI control methods that are defined by the ACPI firmware tables. One potential method for handling the request in the ASL context is described below in connection with FIG. 4. The computing device 100 may use any appropriate technique to invoke the ASL context. In some embodiments, in block 318, the operating system 204 may route platform runtime events to a system control interrupt (SCI), and then the SCI is consumed or otherwise handled by the ASL context. The platform runtime events may include hardware or software initiated interrupts such as thermal events, general purpose I/O (GPIO) events, exceptions, or other events. In some embodiments, the operating system 204 may invoke a particular firmware control method in the ASL context. For example, the operating system 204 may invoke a device-specific method (_DSM) of the bridge driver device object or other ACPI firmware object. After invoking the ASL context, the method 300 loops back to block 316 to continue with the operating system 204 managing runtime execution of the computing device 100.

Figure 4:
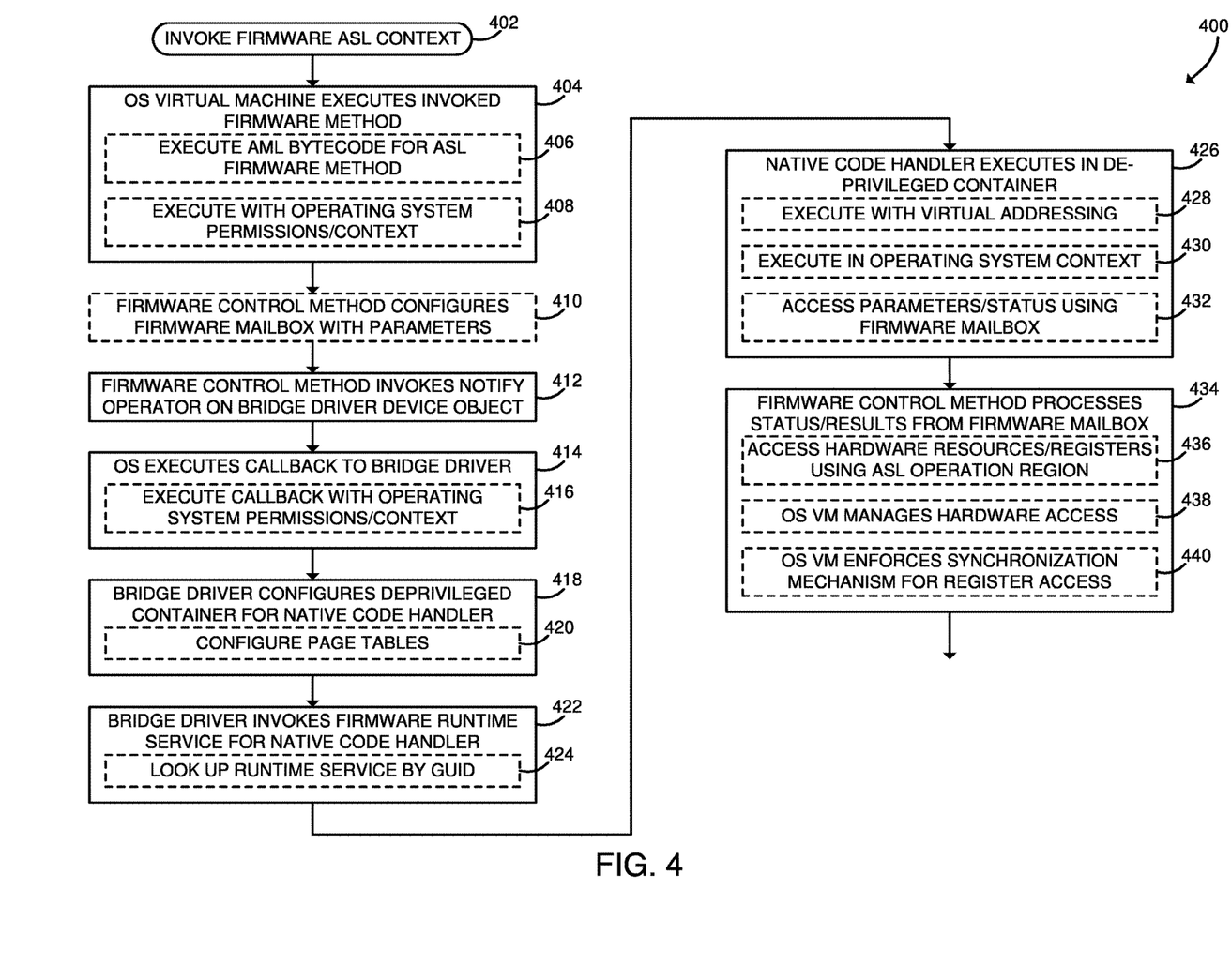
FIG. 4 is a simplified flow diagram of at least one embodiment of a method for secure native code invocation that may be executed by the computing device of FIGS. 1-2.

Referring now to FIG. 4, in use, the computing device 100 may execute a method 400 for secure native code invocation. It should be appreciated that, in some embodiments, the operations of the method 400 may be performed by one or more components of the environment 200 of the computing device 100 as shown in FIG. 2. The method 400 begins with block 402, in which the computing device 100 invokes a firmware ACPI source language (ASL) context. The platform firmware tables include ASL code, which is compiled into ACPI machine language (AML) bytecode. AML bytecode is executed by the firmware virtual machine 220 of the operating system 204. The ASL context thus includes language features and other characteristics of the runtime environment provided by the firmware virtual machine 220.

In block 404, the operating system 204 virtual machine 220 executes an invoked firmware control method. As described above in connection with FIG. 3, the ASL context may be invoked, for example, in response to a system control interrupt (SCI) or in response to invocation of a firmware control method (e.g., _DSM) by the operating system 204. In block 406, the virtual machine 220 executes AML bytecode for the ASL firmware control method. In block 408, the computing device 100 executes the virtual machine 220 with the same permissions and/or in the same operating mode as the operating system 204. For example, the virtual machine 220 may execute with the processor 120 in the same mode as other parts of the operating system 204 (e.g., in protected mode, long mode, or other virtual addressing mode). In some embodiments, the virtual machine 220 may execute with the same permissions level as the operating system 204 (e.g., in protection ring level 0). By executing the firmware control method in the same mode and/or with the same permissions as the operating system 204, the computing device 100 may avoid an expensive context switch between modes (e.g., by avoiding a context switch to SMM).

In some embodiments, in block 410, the firmware control method configures the firmware mailbox with one or more parameters for the native code handler 212. The parameters may include input data, configuration data, or other data used by the native code handler 212. The firmware control method may use any appropriate technique to write to the firmware mailbox. For example, the firmware control method may write the firmware mailbox using an operation region or other technique available in the ASL context.

In block 412, the firmware control method invokes a Notify( ) operator on the bridge driver device object. In ASL, the Notify( ) operator allows ASL code to generate a notification for a particular ASL object. The notification may include one or more data parameters (e.g., hex value 0x80 or other value). The operating system 204 responds to the notification, for example by invoking an ACPI-aware driver.

In block 414, in response to the Notify( ) operator, the operating system 204 executes a callback to the bridge driver 216. The operating system 204 may, for example, execute a callback function of the bridge driver 216 that was previously bound to the bridge driver device object. In block 416, the computing device 100 executes the bridge driver 216 with the same permissions and/or in the same operating mode as the operating system 204. For example, the bridge driver 216 may execute with the processor 120 in the same mode as other parts of the operating system 204 (e.g., in protected mode, long mode, or other virtual addressing mode). In some embodiments, the bridge driver 216 may execute with the same permissions level as the operating system 204 (e.g., in protection ring level 0). By executing the bridge driver 216 in the same mode and/or with the same permissions as the operating system 204, the computing device 100 may avoid an expensive context switch between modes (e.g., by avoiding a context switch to SMM).

In block 418, the bridge driver 216 configures a de-privileged container for the native code handler 212. The bridge driver 216 may use any technique to prevent the native code handler 212 from accessing sensitive hardware resources and/or other data of the computing device 100. For example, the de-privileged container may prevent access to any hardware resources or hardware registers of the computing device 100. In some embodiments, in block 420 the bridge driver 216 may configure one or more page tables, extended page tables (EPT), or other paging structures to establish the de-privileged container. The processor 120 may use the page tables to prevent access by the native code handler 212 to certain sensitive memory ranges, I/O ranges, register addresses, or other sensitive locations. Additionally or alternatively, although illustrated as being configured by the bridge driver 216, it should be understood that in other embodiments the de-privileged container may be configured by other components of the operating system 204.

In block 422, the bridge driver 216 invokes the firmware runtime service 208 for the native code handler 212. The bridge driver 216 may use any appropriate technique to invoke the firmware runtime service 208. For example, the bridge driver 216 may identify a function address or other entry point associated with the firmware runtime service and invoke that entry point using a predetermined function calling convention (e.g., a C calling convention). In some embodiments, in block 424 the bridge driver 216 may look up the firmware runtime service 208 using a GUID or other identifier. For example, the computing device 100 may look up the GUID in a UEFI runtime services table or other data structure.

In block 426, the computing device 100 executes the native code handler 212 in the de-privileged container. The native code handler 212 is executed natively by the processor 120. For example, the native code handler 212 may include processor instructions that are executed directly by the processor 120 without the use of a virtual machine or interpreter. The native code handler 212 may perform platform management tasks, such as thermal management, power management, device hot plug management, or other tasks. In some embodiments, in block 428 the computing device 100 executes the native code handler 212 with virtual addressing enabled. The computing device 100 may, for example, perform virtual addressing using one or more page tables configured as described above. Using virtual addressing with appropriately configured page tables may prevent the native code handler 212 from accessing hardware resources or registers. In some embodiments, in block 430 the computing device 100 executes the native code handler 212 with the same permissions and/or in the same operating mode as the operating system 204. For example, the native code handler 212 may execute with the processor 120 in the same mode as other parts of the operating system 204 (e.g., in protected mode, long mode, or other virtual addressing mode). In some embodiments, the native code handler 212 may execute with the same permissions level as the operating system 204 (e.g., in protection ring level 0). By executing the native code handler 212 in the same mode and/or with the same permissions as the operating system 204, the computing device 100 may avoid an expensive context switch between modes (e.g., by avoiding a context switch to SMM). In some embodiments, in block 432, the native code handler 212 may access parameters and/or status data in the firmware mailbox. The native code handler 212 may, for example, access the firmware mailbox through a firmware reserved memory range or other access technique.

In block 434, after the native code handler 212 completes execution, the firmware control method processes status and/or results from the firmware mailbox. For example, the firmware control method may poll status data in the firmware mailbox until it is determined that the native code handler 212 has completed. After completion, the firmware control method may use results from the native code handler 212 for hardware configuration or other tasks. In some embodiments, in block 436, the firmware control method may access one or more hardware resources or registers using an ASL operation region or other ASL technique. In some embodiments, in block 438, the virtual machine 220 manages hardware accesses initiated from the firmware control method. As described above, the native code handler 212 may be prevented from accessing hardware resources by the de-privileged container. The ASL control method may access hardware resources, but all accesses are mediated or otherwise managed by the operating system 204. In some embodiments, in block 440 the virtual machine 220 may enforce synchronization methods for register accesses. For example, the virtual machine 220 may enforce locking or other synchronization for register access. Thus, the computing device 100 may support native code execution in parallel on multiple processor cores. After the firmware control method processes the results, the method 400 is completed. As described above in connection with FIG. 3, the operating system 204 continues to manage the runtime environment of the computing device 100 and thus the method 400 may continue to be invoked as appropriate.

It should be appreciated that, in some embodiments, the methods 300 and/or 400 may be embodied as various instructions stored on a computer-readable media, which may be executed by the processor 120, the I/O subsystem 122, peripheral devices 130 and/or other components of the computing device 100 to cause the computing device 100 to perform the respective method 300 and/or 400. The computer-readable media may be embodied as any type of media capable of being read by the computing device 100 including, but not limited to, the memory 124, the data storage device 126, firmware devices, other memory or data storage devices of the computing device 100, portable media readable by a peripheral device 130 of the computing device 100, and/or other media.

EXAMPLES

Illustrative examples of the technologies disclosed herein are provided below. An embodiment of the technologies may include any one or more, and any combination of, the examples described below.

Example 1 includes a computing device for native code invocation, the computing device comprising: an operating system to (i) execute a firmware method with a virtual machine in an operating system context, (ii) invoke a callback to a bridge driver in the operating system context in response to execution of the firmware method, and (iii) invoke, by the bridge driver, a firmware runtime service in the operating system context in response to invocation of the callback; and a firmware environment to execute a native code handler in the operating system context in response to invocation of the firmware runtime service.

Example 2 includes the subject matter of Example 1, and wherein the operating system context comprises a processor execution mode.

Example 3 includes the subject matter of any of Examples 1 and 2, and wherein to execute the native code handler comprises to execute the native code handler in a de-privileged container.

Example 4 includes the subject matter of any of Examples 1-3, and wherein: the operating system is further to configure, by the bridge driver, a memory page table in response to the invocation of the callback; and to execute the native code handler in the de-privileged container comprises to execute the native code handler in a virtual addressing mode with the page table.

Example 5 includes the subject matter of any of Examples 1-4, and wherein: the operating system is further to store, by the firmware method executed by the virtual machine, a parameter in a firmware mailbox; the firmware environment is to access, by the native code handler, the parameter in the firmware mailbox in response to execution of the native code handler; and to invoke the callback comprises to invoke the callback in response to storing of the parameter in the firmware mailbox.

Example 6 includes the subject matter of any of Examples 1-5, and wherein: the firmware environment is to store, by the native code handler, results data in a firmware mailbox in response to execution of the native code handler; and the operating system is to process, by the firmware method executed by the virtual machine, the results data in the firmware mailbox in response to the execution of the native code handler.

Example 7 includes the subject matter of any of Examples 1-6, and wherein to process the results data comprises to access a hardware resource of the computing device using a firmware operation region.

Example 8 includes the subject matter of any of Examples 1-7, and wherein to access the hardware resource comprises to access the hardware resource by the operating system of the computing device in response to an access of the firmware operation region.

Example 9 includes the subject matter of any of Examples 1-8, and wherein to access the hardware resource comprises to enforce a synchronization mechanism associated with the hardware resource by the operating system of the computing device.

Example 10 includes the subject matter of any of Examples 1-9, and wherein the firmware method comprises bytecode targeted to the virtual machine.

Example 11 includes the subject matter of any of Examples 1-10, and wherein the firmware method comprises an ACPI machine language firmware control method.

Example 12 includes the subject matter of any of Examples 1-11, and wherein to invoke the callback to the bridge driver comprises to: invoke, by the firmware method executed with the virtual machine, a notify operator on a bridge driver device object of a firmware device hierarchy in response to the execution of the firmware method; and invoke the callback to the bridge driver in the operating system context in response to invocation of the notify operator.

Example 13 includes the subject matter of any of Examples 1-12, and wherein: the firmware environment is further to publish a firmware table that includes the bridge driver device object; the operating system is to bind the bridge driver to the bridge driver device object; and to execute the firmware method comprises to execute the firmware method in response to publishing of the firmware table and binding of the bridge driver to the bridge driver device object.

Example 14 includes the subject matter of any of Examples 1-13, and wherein the firmware table comprises an ACPI table.

Example 15 includes the subject matter of any of Examples 1-14, and wherein: the computing device is to raise a system control interrupt; and to execute the firmware method comprises to execute the firmware method in response to raising of the system control interrupt.

Example 16 includes the subject matter of any of Examples 1-15, and wherein: the operating system is to invoke the firmware method; and to execute the firmware method comprises to execute the firmware method in response to invocation of the firmware method.

Example 17 includes the subject matter of any of Examples 1-16, and wherein: the firmware environment is further to install the native code handler as the firmware runtime service; and to execute the firmware method comprises to execute the firmware method in response to installation of the native code handler.

Example 18 includes the subject matter of any of Examples 1-17, and wherein: to install the native code handler comprises to associate a global unique identifier with the firmware runtime service; and to invoke the firmware runtime service comprises to look up the global unique identifier of the firmware runtime service.

Example 19 includes the subject matter of any of Examples 1-18, and wherein the firmware runtime service comprises a UEFI runtime service.

Example 20 includes a method for native code invocation, the method comprising: executing, by a computing device, a firmware method with a virtual machine in an operating system context; invoking, by the computing device, a callback to a bridge driver in the operating system context in response to executing the firmware method; invoking, by the bridge driver, a firmware runtime service in the operating system context in response to invoking the callback; and executing, by the computing device, a native code handler in the operating system context in response to invoking the firmware runtime service.

Example 21 includes the subject matter of Example 20, and wherein the operating system context comprises a processor execution mode.

Example 22 includes the subject matter of any of Examples 20 and 21, and wherein executing the native code handler comprises executing the native code handler in a de-privileged container.

Example 23 includes the subject matter of any of Examples 20-22, and further comprising: configuring, by the bridge driver, a memory page table in response to invoking the callback; wherein executing the native code handler in the de-privileged container comprises executing the native code handler in a virtual addressing mode with the page table.

Example 24 includes the subject matter of any of Examples 20-23, and further comprising: storing, by the firmware method executed by the virtual machine, a parameter in a firmware mailbox; and accessing, by the native code handler, the parameter in the firmware mailbox in response to executing the native code handler; wherein invoking the callback comprises invoking the callback in response to storing the parameter in the firmware mailbox.

Example 25 includes the subject matter of any of Examples 20-24, and further comprising: storing, by the native code handler, results data in a firmware mailbox in response to executing the native code handler; and processing, by the firmware method executed by the virtual machine, the results data in the firmware mailbox in response to executing the native code handler.

Example 26 includes the subject matter of any of Examples 20-25, and wherein processing the results data comprises accessing a hardware resource of the computing device using a firmware operation region.

Example 27 includes the subject matter of any of Examples 20-26, and wherein accessing the hardware resource comprises accessing the hardware resource by an operating system of the computing device in response to an access of the firmware operation region.

Example 28 includes the subject matter of any of Examples 20-27, and wherein accessing the hardware resource comprises enforcing a synchronization mechanism associated with the hardware resource by an operating system of the computing device.

Example 29 includes the subject matter of any of Examples 20-28, and wherein the firmware method comprises bytecode targeted to the virtual machine.

Example 30 includes the subject matter of any of Examples 20-29, and wherein the firmware method comprises an ACPI machine language firmware control method.

Example 31 includes the subject matter of any of Examples 20-30, and wherein invoking the callback to the bridge driver comprises: invoking, by the firmware method executed with the virtual machine, a notify operator on a bridge driver device object of a firmware device hierarchy in response to executing the firmware method; and invoking, by the computing device, the callback to the bridge driver in the operating system context in response to invoking the notify operator.

Example 32 includes the subject matter of any of Examples 20-31, and further comprising: publishing, by the computing device, a firmware table that includes the bridge driver device object; and binding, by the computing device, the bridge driver to the bridge driver device object; wherein executing the firmware method comprises executing the firmware method in response to publishing the firmware table and binding the bridge driver to the bridge driver device object.

Example 33 includes the subject matter of any of Examples 20-32, and wherein the firmware table comprises an ACPI table.

Example 34 includes the subject matter of any of Examples 20-33, and further comprising: raising, by the computing device, a system control interrupt; wherein executing the firmware method comprises executing the firmware method in response to raising the system control interrupt.

Example 35 includes the subject matter of any of Examples 20-34, and further comprising: invoking, by an operating system of the computing device, the firmware method; wherein executing the firmware method comprises executing the firmware method in response to invoking the firmware method.

Example 36 includes the subject matter of any of Examples 20-35, and further comprising: installing, by the computing device, the native code handler as the firmware runtime service; wherein executing the firmware method comprises executing the firmware method in response to installing the native code handler.

Example 37 includes the subject matter of any of Examples 20-36, and wherein: installing the native code handler comprises associating a global unique identifier with the firmware runtime service; and invoking the firmware runtime service comprises looking up the global unique identifier of the firmware runtime service.

Example 38 includes the subject matter of any of Examples 20-37, and wherein the firmware runtime service comprises a UEFI runtime service.

Example 39 includes a computing device comprising: a processor; and a memory having stored therein a plurality of instructions that when executed by the processor cause the computing device to perform the method of any of Examples 20-38.

Example 40 includes one or more non-transitory, computer readable storage media comprising a plurality of instructions stored thereon that in response to being executed result in a computing device performing the method of any of Examples 20-38.

Example 41 includes a computing device comprising means for performing the method of any of Examples 20-38.

The invention claimed is:

1. A computing device for native code invocation, the computing device comprising:
   a hardware processor; and
   one or more memory devices having stored therein a plurality of instructions that, when executed by the hardware processor, cause the computing device to establish: an operating system to (i) execute a firmware method with a firmware virtual machine in an operating system context, (ii) invoke a callback to an operating system bridge driver in the operating system context in response to execution of the firmware method, and (iii) invoke, by the operating system bridge driver, a firmware runtime service in the operating system context in response to invocation of the callback, wherein the operating system context comprises a processor permissions level of the hardware processor; and
   a firmware environment to execute a native code handler in the operating system context in response to invocation of the firmware runtime service, the operating system bridge driver, the firmware virtual machine and the native code handler to execute with a same processor permissions level as the operating system.

2. The computing device of claim 1, wherein the operating system context comprises a processor execution mode, the firmware method comprises an Advanced Configuration and Power Interface (ACPI) machine language firmware control method and the firmware runtime service comprises a Unified Extensible Firmware Interface (UEFI) runtime service.

3. The computing device of claim 1, wherein to execute the native code handler comprises to execute the native code handler in a de-privileged container.

4. The computing device of claim 3, wherein:
   the operating system is further to configure, by the operating system bridge driver, a memory page table in response to the invocation of the callback; and
   to execute the native code handler in the de-privileged container comprises to execute the native code handler in a virtual addressing mode with the memory page table.

5. The computing device of claim 1, wherein:
   the operating system is further to store, by the firmware method executed by the firmware virtual machine, a parameter in a firmware mailbox;
   the firmware environment is to access, by the native code handler, the parameter in the firmware mailbox in response to execution of the native code handler; and
   to invoke the callback comprises to invoke the callback in response to storing of the parameter in the firmware mailbox.

6. The computing device of claim 1, wherein:
   the firmware environment is to store, by the native code handler, results data in a firmware mailbox in response to execution of the native code handler; and
   the operating system is to process, by the firmware method executed by the firmware virtual machine, the results data in the firmware mailbox in response to the execution of the native code handler.

7. The computing device of claim 6, wherein to process the results data comprises to access a hardware resource of the computing device using a firmware operation region.

8. The computing device of claim 7, wherein to access the hardware resource comprises to enforce a synchronization mechanism associated with the hardware resource by the operating system of the computing device.

9. The computing device of claim 1, wherein to invoke the callback to the operating system bridge driver comprises to:
invoke, by the firmware method executed with the firmware virtual machine, a notify operator on a bridge driver device object of a firmware device hierarchy in response to the execution of the firmware method; and
invoke the callback to the operating system bridge driver in the operating system context in response to invocation of the notify operator.

10. The computing device of claim 9, wherein:
the firmware environment is further to publish a firmware table that includes the bridge driver device object, the firmware table comprises an Advanced Configuration and Power Interface (ACPI) table;
the operating system is to bind the operating system bridge driver to the bridge driver device object; and
to execute the firmware method comprises to execute the firmware method in response to publishing of the firmware table and binding of the operating system bridge driver to the bridge driver device object.

11. The computing device of claim 1, wherein:
the computing device is to raise a system control interrupt; and
to execute the firmware method comprises to execute the firmware method in response to raising of the system control interrupt.

12. The computing device of claim 1, wherein:
the operating system is to invoke the firmware method; and
to execute the firmware method comprises to execute the firmware method in response to invocation of the firmware method.

13. The computing device of claim 1, wherein:
the firmware environment is further to install the native code handler as the firmware runtime service; and
to execute the firmware method comprises to execute the firmware method in response to installation of the native code handler.

14. A method for native code invocation, the method comprising:
executing, by a computing device, a firmware method with a firmware virtual machine in an operating system context;
invoking, by the computing device, a callback to an operating system bridge driver in the operating system context in response to executing the firmware method;
invoking, by the operating system bridge driver, a firmware runtime service in the operating system context in response to invoking the callback, wherein the operating system context comprises a processor privilege level; and
executing, by the computing device, a native code handler in the operating system context in response to invoking the firmware runtime service, the operating system bridge driver, the firmware virtual machine and the native code handler to execute with a same processor permissions level as the operating system.

15. The method of claim 14, wherein the operating system context comprises a processor execution mode, the firmware method comprises an Advanced Configuration and Power Interface (ACPI) machine language firmware control method and the firmware runtime service comprises a Unified Extensible Firmware Interface (UEFI) runtime service.

16. The method of claim 14, wherein executing the native code handler comprises executing the native code handler in a de-privileged container.

17. The method of claim 14, further comprising:
storing, by the firmware method executed by the firmware virtual machine, a parameter in a firmware mailbox;
accessing, by the native code handler, the parameter in the firmware mailbox in response to executing the native code handler; and
wherein invoking the callback comprises invoking the callback in response to storing the parameter in the firmware mailbox.

18. The method of claim 14, further comprising:
storing, by the native code handler, results data in a firmware mailbox in response to executing the native code handler; and
processing, by the firmware method executed by the firmware virtual machine, the results data in the firmware mailbox in response to executing the native code handler.

19. The method of claim 18, wherein processing the results data comprises accessing a hardware resource of the computing device using a firmware operation region.

20. One or more non-transitory, computer-readable storage media comprising a plurality of instructions stored thereon that, in response to being executed, cause a computing device to:
execute a firmware method with a firmware virtual machine in an operating system context;
invoke a callback to an operating system bridge driver in the operating system context in response to executing the firmware method;
invoke, by the operating system bridge driver, a firmware runtime service in the operating system context in response to invoking the callback, wherein the operating system context comprises a processor privilege level; and
execute a native code handler in the operating system context in response to invoking the firmware runtime service, the operating system bridge driver, the firmware virtual machine and the native code handler to execute with a same processor permissions level as the operating system.

21. The one or more non-transitory, computer-readable storage media of claim 20, wherein the operating system context comprises a processor execution mode, the firmware method comprises an Advanced Configuration and Power Interface (ACPI) machine language firmware control method and the firmware runtime service comprises a Unified Extensible Firmware Interface (UEFI) runtime service.

22. The one or more non-transitory, computer-readable storage media of claim 20, wherein to execute the native code handler comprises to execute the native code handler in a de-privileged container.

23. The one or more non-transitory, computer-readable storage media of claim 20, further comprising a plurality of instructions stored thereon that, in response to being executed, cause the computing device to:
store, by the firmware method executed by the firmware virtual machine, a parameter in a firmware mailbox;
access, by the native code handler, the parameter in the firmware mailbox in response to executing the native code handler; and
wherein to invoke the callback comprises to invoke the callback in response to storing the parameter in the firmware mailbox.

24. The one or more non-transitory, computer-readable storage media of claim 20, further comprising a plurality of instructions stored thereon that, in response to being executed, cause the computing device to:

store, by the native code handler, results data in a firmware mailbox in response to executing the native code handler; and process, by the firmware method executed by the firmware virtual machine, the results data in the firmware mailbox in response to executing the native code handler.

25. The one or more non-transitory, computer-readable storage media of claim 24, wherein to process the results data comprises to access a hardware resource of the computing device using a firmware operation region.

\* \* \* \* \*